C. L. McAFEE.
ANIMAL TRAP.
APPLICATION FILED MAR. 19, 1912.

1,048,422.

Patented Dec. 24, 1912.

Witnesses
L. B. James

Inventor
C. L. McAfee
by H. B. Willson &Co.
Attorneys

UNITED STATES PATENT OFFICE.

CHARLES L. McAFEE, OF BEVERLY, KANSAS, ASSIGNOR TO FUNSTEN BROTHERS & COMPANY, OF ST. LOUIS, MISSOURI, A CORPORATION OF ILLINOIS.

ANIMAL-TRAP.

1,048,422.

Specification of Letters Patent.

Patented Dec. 24, 1912.

Application filed March 19, 1912. Serial No. 684,845.

*To all whom it may concern:*

Be it known that I, CHARLES L. McAFEE, a citizen of the United States, residing at Beverly, in the county of Lincoln and State of Kansas, have invented certain new and useful Improvements in Animal-Traps; and I do declare the following to be a full, clear, and exact description of the invention, such as will enable others skilled in the art to which it appertains to make and use the same.

This invention relates to improvements in animal traps, and more particularly to the construction of the gripping teeth thereof and the means for attaching the same to the trap.

The object of the invention is therefore in the construction of an attachment of the class described which can be readily and securably fixed to one side or arm of the trap, the latter being of conventional design.

A further and important object of the invention consists in the particular formation and arrangement of the attaching lugs forming a part of the plate of one of the gripping jaws of the trap, whereby, said plate is readily and rigidly secured to the jaw.

With these and other objects in view, the invention consists of certain novel features of construction and arrangement of parts as will be more fully described and particularly pointed out in the appended claim.

Figure 1:
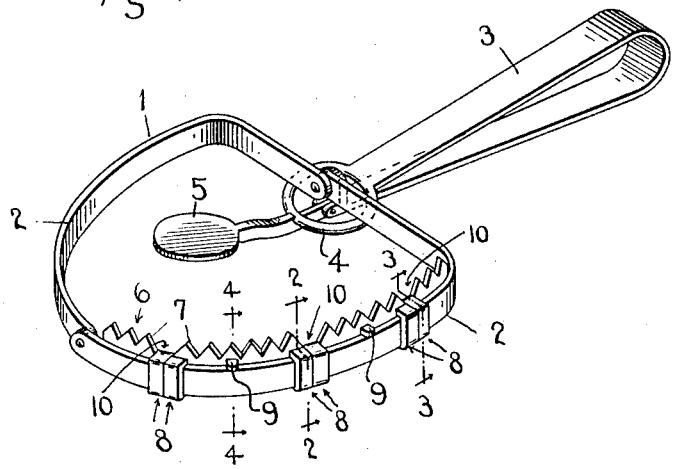
Figure 2:
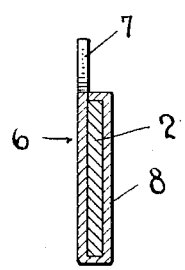
Figure 3:
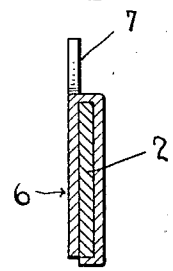
Figure 5:
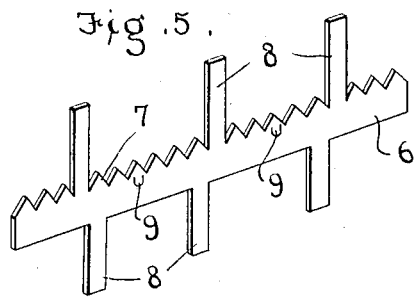
Figure 4:
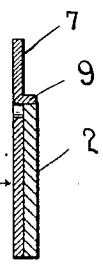

In the accompanying drawings; Figure 1 is a perspective view of a trap to which the invention is secured; Fig. 2 is a transverse section taken on the line 2—2 of Fig. 1; Fig. 3 is a similar section taken on the line 3—3 of Fig 1; Fig. 4 is also a similar view taken on the line 4—4 of Fig. 1; Fig. 5 is a perspective view of a blank from which the gripping jaw is formed.

In the illustrated embodiment of the invention 1 represents an animal trap of conventional design which as usual is composed of two hingedly connected jaws 2 which are adapted to be forced together by a one piece spring 3 having a looped upper end 4 and a bait trip lever 5 and a lug forming an extension of the lower end of said spring and passing through the loop 4 to which one end of the jaws is hingedly attached, the inner end of said trip lever being movably attached to the lug below the said loop and having its intermediate interlocking portion adapted for engagement with the loop as clearly shown in Fig. 1.

The invention consists of a gripping jaw in the form of a metallic strip 6, the upper edge of which is serrated or provided with teeth 7, the length of said plate being substantially the length of the curved inner surface of the jaw 2 of the trap to which the same is rigidly attached.

As clearly shown in Fig. 1 the serrated edge of the plate 6 projects a suitable distance above the upper edge of the hinge jaw of the trap to which same is attached, and only one of such plates is employed in properly carrying out the utility and advantages of the invention.

As clearly shown in Fig. 5 the serrated plate 6 is composed of comparatively thin metal with oppositely and alternately projecting extensions or arms 8, the adjacent edges of which are adapted to be bindingly brought in contact when the same are folded around the jaw 2 of the trap as clearly shown in Fig. 1.

Referring again to Figs. 1 and 5 it will be observed that the plate 6 is provided with outwardly projecting short lugs 9, the length of which corresponds substantially to the width of the upper edge of the jaw 2 to which the plate is attached and in frictional contact with the same when the arms 8 are bindingly brought around said jaw and closely positioned in respect thereto. It will thus be seen that said plate 6 in view of the construction of the same is rigidly held in proper position in respect to jaw 2 of the trap with the serrated portion thereof projecting a suitable distance above the upper edge of the jaw to which the same is attached.

As clearly shown in Fig. 1 the arms 8 when folded about the jaw 2 of the trap will form spaces 10 at intervals along the length of the plurality of disposed teeth of the plate and when the same are thus folded, the plate is properly strengthened.

From the foregoing description it will be obvious that the plate 6 cannot possibly move or shift its position in respect to the jaw to which it is attached, the opposite ends of said plate being in contact with the rear straight continuation of the jaw and the hinge portion thereof.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined in the appended claim.

I claim as my invention:

The combination with a trap of the character described, of a yielding plate adapted to conform to the curvature of one of the movable jaws of the trap and extending between the pivoted ends of the jaws, the upper edge of said plate being provided with teeth, arms forming a part of the plate and projecting in alternate directions therefrom and adapted for binding contact with one another and with the jaw of the trap to which the plate is attached, and lugs projecting from the plate for engagement with the upper edge of the jaw, said lug being positioned between the arms of the plate.

In testimony whereof I have hereunto set my hand in presence of two subscribing witnesses.

CHARLES L. McAFEE.

Witnesses:
 PETE BERGMAN,
 W. A. DEHNER.

Copies of this patent may be obtained for five cents each, by addressing the "Commissioner of Patents, Washington, D. C."